United States Patent [19]

Kray et al.

[11] Patent Number: 4,755,370

[45] Date of Patent: Jul. 5, 1988

[54] PURIFICATION OF SILICON HALIDES

[75] Inventors: William D. Kray, Burnt Hills; John S. Razzano, Cohoes, both of N.Y.

[73] Assignee: General Electric Company, Waterford, N.Y.

[21] Appl. No.: 712,913

[22] Filed: Mar. 18, 1985

Related U.S. Application Data

[63] Continuation of Ser. No. 359,437, Mar. 18, 1982, abandoned.

[51] Int. Cl.$^4$ ............................................. C01B 33/107
[52] U.S. Cl. ..................................... 423/342; 423/341
[58] Field of Search ....................... 423/341, 342, 350

[56] References Cited

U.S. PATENT DOCUMENTS

| | | | |
|---|---|---|---|
| 2,857,249 | 11/1958 | Wolff | 23/205 |
| 3,041,141 | 6/1962 | Shoemaker et al. | 23/204 |
| 3,126,248 | 3/1964 | Pohl et al. | 23/14 |
| 3,403,003 | 9/1968 | Morgenthaler | 23/205 |
| 3,540,861 | 11/1970 | Bradley et al. | 423/342 |
| 4,112,057 | 9/1978 | Lang et al. | 423/342 |

OTHER PUBLICATIONS

V. E. Wiberg and U. Kruerke, *Uber die Spaltung der Silicium-Sauerstoff-Bindung durch Borhalogenide*, Z. Naturforschg., 8 b, 610–611 [1953], eingeg. am 11, Sep. 1953.

P. A. McCusker and T. Ostdick, O.S.B., *Reactions of Haloboranes* with Organocyclosiloxanes. I. Boron Chloride with Methyl and Ethyl *Trimer and Tetramer*, J. of Amer. Chem. Soc. 80:1103–1106 (1958), paper presented to ACS meeting, Sep. 30, 1957.

P. A. McCusker and T. Ostdick, O.S.B., *Reactions of Haloboranes with Organocyclosiloxanes. II. Boron Fluoride with Methyl and Ethyl Trimer and Tetramer*, J. of Amer. Chem. Soc. 81:5550–5553 (1959).

*Primary Examiner*—Jack Cooper
*Attorney, Agent, or Firm*—Gary L. Loser; John W. Harbour

[57] ABSTRACT

A method for the selective removal of boron halides and other Lewis acid-type impurities from silicon halides is disclosed. Treatment of contaminated silicon halides with siloxanes, which react with the impurities, allow the distillation of silicon halide which is virtually free from contamination within extremely low limits of detectability.

14 Claims, No Drawings

PURIFICATION OF SILICON HALIDES

This application is a continuation of application Ser. No. 359,437, filed Mar. 18, 1982, now abandoned.

This invention relates to the preparation of trichlorosilane for the manufacture of electronic grade silicon and, more particularly, to novel methods for removing trace impurities of electrical donor contaminates, especially boron and other Lewis acid or proton donor-type impurities.

Silicon of extremely high purity is required for sophisticated electronics uses such as in semiconductors and transistors. It is well known that even trace impurities can seriously impair the performance of silicon-containing electronic components.

Elemental silicon for semiconductor use is generally prepared by reduction of silicon halides, such as silicon tetrachloride ($SiCl_4$), trichlorosilane ($HSiCl_3$) and dischlorosilane ($H_2SiCl_2$), with hydrogen, zinc, sodium or metal hydrides. Silicon may also be derived from thermal decomposition of silane ($SiH_4$), but this latter material is hard to work with because it burns explosively on contact with air.

One of the most difficult impurities to remove from high purity silicon is boron. Whereas other common impurities such as copper, iron and manganese are comparatively easy to remove by conventional techniques (e.g., zone refining, crystal pulling), boron has physical properties so similar to silicon that separation is accomplished only by repeated trials. Moreover, concentrating purification efforts on the starting material, e.g., chlorosilanes, is likewise difficult because boron forms corresponding compounds with similar properties.

Various compounds, for example, phenols, triphenoles, and nitrogen-containing compounds, have been used in the past to complex and bind with impurities in near-pure silicon halide solutions. U.S. Pat. Nos. 3,403,003 (Morganthaler); 3,126,248 (Pohl et al.); and 3,041,141 (Shoemaker et al.), for instance, describe such treatments. The prevailing conventional technique for removing boron contaminates, disclosed in U.S. Pat. No. 4,112,057 (Lang et al.), involves introducing water vapor on silica gel to chlorosilane solutions. However, problems with regeneration of the impurities and corrosion are experienced.

It has now been discovered that boron chlorides and other Lewis acids can be removed almost totally from chlorosilane solutions by the introduction of organosiloxanes. The siloxanes react or complex with the impurities and subsequently react to form thermally stable compounds, i.e., borosiloxanes, which are left behind in a distillation of the chlorosilane.

Accordingly, it is an object of the present invention to provide a novel method for purifying silicon halides.

It is another object of the present invention to provide a method for removing boron halides, Lewis acid and proton donor-type compounds from silicon halide solutions.

It is another object of the present invention to provide a purification method which is irreversible and non-corrosive.

It is another object of the present invention to provide a means of obtaining electronic grade silicon from high purity trichlorosilane.

These and other objects are accomplished herein by a method for purifying silicon halides comprising:

(A) adding to a solution of silicon halide contaminated with Lewis acid impurities a stoichiometric excess, based on the concentration of the impurities, of an organosiloxane;

(B) reacting the impurities in solution with said siloxanes at a temperature of from about 25° C. to 200° C. until substantially all the impurities form non-volatile products; and thereafter (C) removing purified silicon halide by distillation.

DETAILED DESCRIPTION OF THE INVENTION

The method of this invention involves contacting the boron halide or other Lewis acid impurity present in a silicon halide solution with a molar excess of an organosiloxane, heating the solution to cause a reaction between the impurities and the siloxane to yield compounds of lower vapor pressure than the silicon halide, and then distilling the pure silicon halide off, leaving the siloxane-bound impurities behind. This method is very effective for removing boron contaminates, especially from solutions of silicon chlorides, such as trichlorosilane. The boron concentration in a solution of trichlorosilane can be reduced by the treatment of the present invention to less than 50 parts per trillion (ppt).

For the purposes herein, a "Lewis acid" is any substance that will take up an electron pair to form a covalent bond (i.e., "electron-pair acceptor"). This includes the "proton donor" concept of the Lowry-Brønsted definition of acids. Thus boron trifluoride ($BF_3$) is a typical Lewis acid, as it contains only six electrons in its outermost electron orbital shell. $BF_3$ tends to accept a free electron pair to complete its eight-electron orbital.

The siloxane compounds suitable for the purposes herein are any organosiloxanes which will react with the boron or other impurity present in the silicon halide solution to form impurity-siloxane compounds (e.g., borosiloxane) having a lower vapor pressure than the solution to be purified, such that a pure silicon-containing solution may be distilled from the reaction vessel, leaving the impurity-siloxane compounds behind. These siloxanes include aklyl, aryl, halogenated alkyl, halogenated aryl or hydrogen substituted alkyl or aryl cyclotrisiloxanes and cyclotetrasiloxanes such as hexamethylcyclotrisiloxane, octamethylcyclotetrasiloxane, polydimethylsiloxane fluids, dimethyl (methyl hydrogen) siloxane copolymers and other cyclic ciloxane monomers. Cyclotrisiloxanes, alkyl cyclotrisiloxanes, halogenated alkyl cyclotrisiloxanes are preferred; hexamethylcyclotrisiloxane is most preferred.

The siloxanes are added to the contaminated silicon halides solution in an amount which will ensure reaction of the siloxanes with the Lewis acid impurtites. Best resutls are obtained if this amount is a large molar excess, for example 5–100 times, based on the concentration of the contaminate. However, any amount of siloxane suitable to effectively bind the impurities present in the solution is contemplated.

After the siloxane is mixed into the solution, the mixture is heated to drive the reaction of the siloxanes with the Lewis acid impurities. At very high temperatures, i.e., temperatures over 200° C., there may occur some degradation of the siloxane compound and volatile borates may form. At low temperatures the reaction may not be sufficient to effectively remove all of the $BCl_3$. For these reasons a reaction temperature range from 25° C. to about 200° C. is preferred, from about 80° C. to about 130° C. is most preferred, but higher temperatures are also contemplated so long as the reaction products will not be distilled in the same fraction as the silicon halide, and thereby confound the purification. Best results have been obtained at about 100° C.

As mentioned before, the reaction is allowed to proceed until substantially all of the impurities are bound to siloxane compounds. The time will of course vary according to materials used, temperature used, pressure, etc. Simple experimentation will readily lead to the optimum reaction period for a given purification.

The final step in the purification of the present invention is to distill the pure silicon halide from the reaction solution. The decreased volatility of the siloxane-bound impurities compared to the silicon halides makes this final distillation possible.

The distillation may be carried out at atmospheric pressures or at higher pressure so long as the temperature of the liquid material does not exceed the decomposition temperature of the borates formed in the process. It is preferred to maintain the temperature of the liquid below about 200° C.

In order that persons skilled in the art may readily understand the practice of the instant invention, the following examples are provided by way of illustration, and not by way of limitation.

EXAMPLE 1

7 parts by weight hexamethylcyclotrisiloxane (trimer) was admixed with a solution of 150 parts by weight trichlorosilane (TCS) containing 5000 parts per million (ppm) boron trichloride ($BCl_3$) and agitated periodically for 1 hour. A sample of TCS distilled from the reaction mixture content contained no $BCl_3$ or borates as determined by infrared spectroscopy with a limit of detectability of 25 ppm.

EXAMPLE 2

A solution of TCS containing 5 parts per billion (ppb) $BCl_3$ and 25 ppb trimer were mixed at 120° C. under 120 psig. A spectroscopic analysis, with a limit of detectability of 25 parts per trillion (ppt) of a sample of distillate indicates that all of the $BCl_3$ was consumed.

EXAMPLE 3

200 ppm of trimer was added to a solution of TCS containing 2 ppm $BCl_3$. The mixture was heated in an oil bath to 130°–135° C. at 100 psig for 4 hours. After standing overnight, 4 fractions were distilled and analyzed for boron content by the colorometric method used in Example 2.

| Fractions | Weight (g) | Boron (parts per trillion) |
|---|---|---|
| 1 | 300 | less than 50 |
| 2 | 100 | less than 50 |
| 3 | 1050 | less than 50 |
| 4 | 500 | less than 50 |
|   | 1950 g. |   |

The charge to the distillation vessel was 2000 g. with 99% of the material recovered, the presence of boron was less than 50 parts per trillion in each of the distilled fractions.

EXAMPLES 4 and 5

The procedure of Example 3 was repeated twice, with the following results:

| Fraction | Boron (parts per trillion) |
|---|---|
| 5 | less than 50 |
| 6 | less than 50 |
| 7 | less than 50 |
| 8 | less than 50 |
| 9 | less than 50 |
| 10 | less than 30 |
| 11 | less than 25 |
| 12 | less than 25 |

EXAMPLE 6

400 parts by weight of 0.018 molar $BCl_3$ (5000 ppm) in TCS was placed in a reaction vessel with sufficient trimer to make the solution 0.09 molar. The reaction mixture was agitated under pressure and samples distilled periodically for analysis by infrared spectroscopy as in Example 1:

| Fraction | Pressure (psig) | Approximate Temperature | Boron (parts per million) |
|---|---|---|---|
| (pot sample at start) 1 | 0 | 23° C. | 5,000 |
| 2 | 20 | 55° C. | 1,000 |
| 3 | 40 | 75° C. | not measurable |
| 4 | 60 | 85° C. | not measurable |
| 5 | 80 | 95° C. | not measurable |
| 6 | 100 | 110° C. | not measurable |
| 7 | 120 | 120° C. | not measurable |

We claim:
1. A method for purifying silicon halides comprising:
   (A) adding to a solution of silicon halide contaminated with small amounts of Lewis acid impurities a stoichiometric excess, based on the concentration of the impurites, of an organosiloxane selected from the group consisting of cyclic siloxane monomers, polydimethylsiloxane fluids and dimethyl (methyl hydrogen)siloxane copolymers;
   (B) reacting the impurites in solution with said organosiloxane at a temperature of from about 100° C. to 200° C. until substantially all the impurities form non-volatile products; and thereafter
   (C) removing purified silicon halide by distillation.
2. The method of claim 1 wherein said impurities contain boron.
3. The method of claim 2 wherein said boron impurities are boron halides.
4. The method of claim 1 wherein said silicon halides are selected from the group consisting of silicon tetrachloride, trichlorosilane, and dichlorosilane.
5. The method of claim 4 wherein the silicon halide is trichlorosilane.
6. The method of claim 1 wherein the organosiloxane is selected from the group consisting of cyclotrisiloxanes, cyclotetrasiloxanes, polydimethylsiloxane fluids and dimethyl (methyl hydrogen) siloxane copolymers.
7. The method of claim 6 wherein the organosiloxane is a cyclotrisiloxane.

8. The method of claim 7 wherein the cyclotrisiloxane is selected from the group consisting of cyclotrisiloxane, aryl cyclotrisiloxanes, alkyl cyclotrisiloxanes, halogenated alkyltrisiloxanes.

9. The method of claim 8 wherein the cyclotrisiloxane is an alkyl cyclotrisiloxane.

10. The method of claim 9 wherein the alkyl cyclotrisiloxane is hexamethylcyclotrisiloxane.

11. The method of claim 6 wherein the organosiloxane is octamethyltetrasiloxane.

12. The method of claim 1 wherein the cyclic diorganopolysiloxane or linear derivative thereof is added to a concentration of 5–100 times the molar concentration of the Lewis acid impurities.

13. The method of claim 1 wherein the silicon halide is trichlorosilane, the Lewis acid impurities are predominantly boron trichloride, the organosiloxane is hexamethylcyclotrisiloxane, and said hexamethylcyclotrisiloxane is added in conventration of about 100 times that of the boron trichloride impurity.

14. The method of claim 1 wherein the temperature in step (B) is from about 100° C. to about 130° C.

* * * * *